United States Patent Office
3,136,660
Patented June 9, 1964

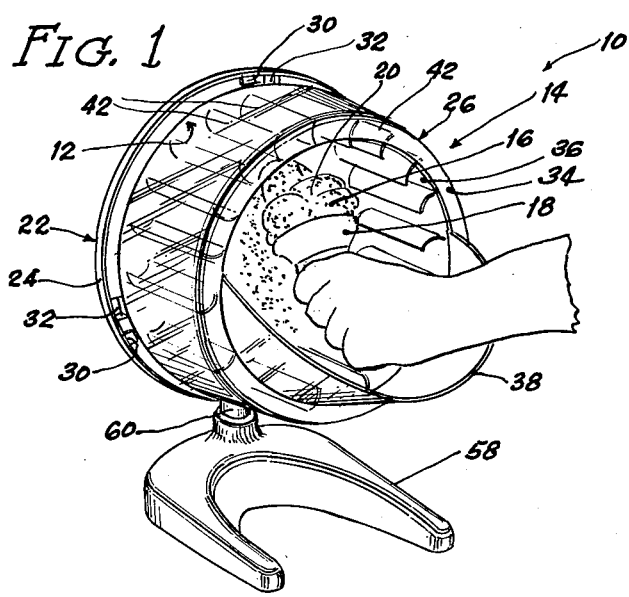
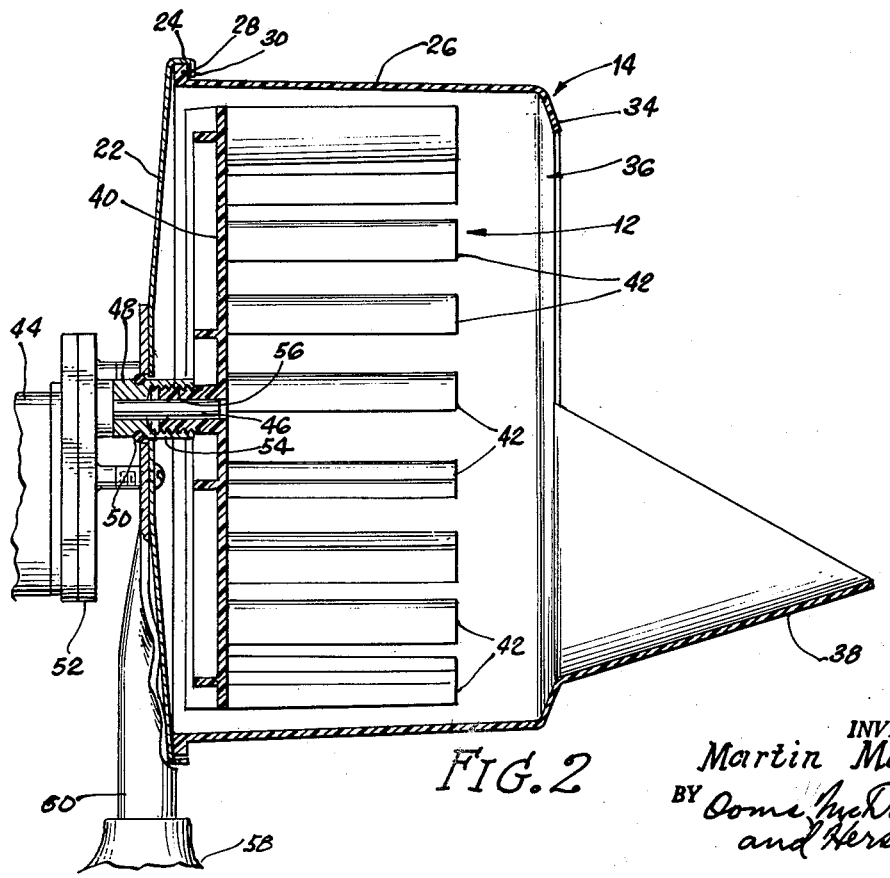
INVENTOR.
Martin Mueller

3,136,660
APPLICATOR MACHINE FOR APPLYING GRANULAR TOPPINGS TO ICE CREAM OR THE LIKE
Martin Mueller, Chicago, Ill., assignor to
Seymour C. Graham, Chicago, Ill.
Filed Jan. 12, 1962, Ser. No. 165,823
2 Claims. (Cl. 118—24)

This invention relates to a new and improved machine for applying granular topping material to ice cream cones, other frozen dairy desserts, and the like.

One object of the present invention is to provide a new and improved applicator machine which provides a substantially continuous shower of granular material without any loss of the material.

A further object is to provide a new and improved machine of the foregoing character which is arranged so that the ice cream cone or other dessert may be inserted into the machine through an opening therein, so that the ice cream cone will be positioned in the shower of granular material and will be covered or topped with the granular material.

Another object is to provide a new and improved applicator machine of the foregoing character having means for preventing any granular material from spilling from the machine.

It is a further object to provide a new and improved applicator machine which may easily be disassembled for cleaning.

Another object of the invention is to provide an applicator machine which is dependable and effective in operation yet is low in cost.

Further objects and advantages of the present invention will appear from the following description, taken with the accompanying drawings, in which:

FIG. 1 is a perspective view illustrating an applicator machine to be described as an illustrative embodiment of the present invention.

FIG. 2 is a central vertical section taken through the applicator machine of FIG. 1.

As already indicated, the drawings illustrate an applicator machine 10 comprising an applicator wheel 12 which is mounted within a housing 14. When a supply of granular topping material is placed in the lower portion of the housing 14, the applicator wheel 12 provides a substantially continuous downward shower of the granular material in the housing. Thus, the item to be topped may be inserted into the housing 14 and held in the shower of granular material until the desired coating of granular material has been applied to such item. The machine 10 is particularly adapted for applying granular topping materials to frozen dairy desserts such as ice cream cones or similar cones made with ice milk, for example. Thus, FIG. 1 illustrates the manner in which an ice cream cone 16 may be inserted into the housing 14 to receive a granular topping, which may take the form of particles of candy, nuts, coconut, or any other confection or suitable food. The ice cream or ice milk cone 16 comprises the usual bakery cone 18 filled with an upwardly projecting mass of ice cream, ice milk or other frozen dairy dessert 20.

As illustrated, the housing 14 comprises a rear wall or disk 22 which is generally circular in shape. A peripheral flange 24 of generally cylindrical shape projects forwardly from the rear wall 22.

The peripheral wall of the housing 14 is provided by a generally cylindrical drum 26 which is removably mounted on the rear wall 22. The drum 26 has a mounting or locking flange 28 which projects radially outwardly from the rear end of the drum. The mounting flange 28 is adapted to be received within the peripheral flange 24 on the rear wall 22. To retain the flange 28, the rear wall 22 is formed with a plurality of locking lugs 30 which project radially inwardly from the front edge of the flange 24. Notches or slots 32 are formed in the flange 28 to pass the lugs 30 so that the drum 26 may be mounted on the rear wall 22. The drum 26 is locked in place by rotating the drum through a small angle so that the lugs 30 will interlock with the flange 28. It is a simple matter to remove the drum 26 so that the housing 14 may be thoroughly cleaned.

The drum 26 has a partial front wall 34 in the form of a flange which projects radially inwardly. The inner end of the flange 34 defines a rather large front opening 36 through which the ice cream cone 16 or the like may be inserted into the housing 14.

To prevent any of the granular material from dropping out of the housing 14, the lower portion of the front wall flange 34 is provided with a chute 38 which is inclined downwardly into the front opening 36. The chute 38 projects forwardly from the drum 26 and catches any granular material that might otherwise be thrown out of the housing through the front opening 36. The chute 38 is curved to conform with the circular shape of the front opening 36.

As illustrated, the applicator wheel 12 comprises a rear disk or mounting plate 40 which is disposed in the rear portion of the housing 14. A plurality of scoops or buckets 42 project forwardly from the disk 40 and are spaced around the edge portion of the disk. As the disk 40 is rotated, the scoops or paddles 42 pick up granular material from the lower portion of the housing 14 and carry the granular material to the upper portion of the housing, where the granular material is dumped to form a substantially continuous downward shower of granular material. This action is illustrated to some advantage in FIG. 1. It will be seen that the paddles or scoops 42 are generally in radial planes but are curved so as to retain the granular material until the scoops approach the top of the housing 14. In this case, the curvature of the scoops 42 is generally cylindrical.

The applicator wheel 12 may be driven, either continuously or intermittently, by an electric motor 44 which is mounted on the rear side of the rear wall 22. The motor 44 has an output shaft 46 which projects through the rear wall 22 into the housing 14. A bushing 48 may be mounted on the rear wall 22 to receive the shaft 46. In this case, a sealing ring 50 is provided between the shaft 46 and the bushing 48. The motor 44 may include a gear box 52 so that the output shaft 46 will be rotated at low speed.

Means are preferably provided for removably mounting the applicator wheel 12 on the shaft 46. In this case, the supporting disk 40 of the wheel 12 is provided with an externally threaded, rearwardly projecting hub portion 54 which may be screwed into an internally threaded portion 56 at the front end of the shaft 46. The direction of the screw threads on the members 54 and 56 is preferably such that the wheel 12 will be tightened rather than loosened on the shaft 46 by the normal rotation of the shaft. In this case, the wheel 12 is adapted to rotate in a clockwise direction as viewed from the front. Thus, left-hand threads are preferably employed on the threaded members 54 and 56.

The housing 14 may be supported by means of a base 58. A single column or pedestal 60 may extend between the base 58 and the rear wall 22. The base 58 is adapted to be supported on a table, counter top or the like.

The applicator machine 10 is used by placing a quantity of the granular topping material in the lower portion of the housing 14. The motor 44 is then energized to rotate the applicator wheel 12 in a clockwise direction. The scoops or vanes 42 on the wheel 12 dip into the granular material and carry the material upwardly until it is dumped near the top of the housing 14 to form a substantially continuous downward shower of the material. The ice cream cone or other item to be topped is inserted into the housing 14 through the front opening 36 so that the ice cream or the like will be positioned in the shower of granular material. The ice cream cone may be rotated manually to provide a uniform coating of the granular material. It will be understood that ice milk, other frozen dairy desserts, and any other suitable items may be topped with granular material by the use of the present machine.

The drum 26 may be made of transparent plastic or the like so that the action of the machine will be clearly visible to the operator. The wheel 12 and the rear wall 22 may be made of metal, plastic, or any other suitable material.

The machine may readily be cleaned by turning the drum 14 until the slots 32 are aligned with the lugs 30, whereupon the drum may be removed from the rear wall 22. The wheel 12 may then be unscrewed from the drive shaft 46.

It will be realized that the applicator machine is effective and dependable in operation. Nevertheless, it is easy to manufacture and low in cost.

Various modifications, alternative constructions and equivalents may be employed without departing from the true spirit and scope of the invention, as exemplified in the foregoing description and defined in the following claims.

I claim:

1. In a machine for applying granular toppings to frozen dairy desserts or the like,
   the combination comprising a housing including a substantially circular generally vertical rear wall,
   a generally cylindrical drum having its rear end mounted on said rear wall,
   said drum having a retaining flange projecting inwardly at the front end of said drum,
   said retaining flange having a generally circular inner edge defining a front opening in said drum through which the dessert to be topped may be inserted,
   a wheel within said housing and having a generally circular disk member,
   a motor for rotating said wheel and disposed behind said rear wall of said housing,
   said rear wall having a central hole therein,
   a rotatable shaft extending forwardly from said motor and through said hole in said rear wall for rotating said wheel,
   means removably mounting said disk member of said wheel on said shaft,
   said disk member of said wheel having a plurality of scoop members projecting forwardly therefrom and spaced around the outer portion of said disk member for scooping granular material from the lower portion of said housing and dumping the granular material in the upper portion of said housing to provide a substantially continuous downward shower of granular material in said housing,
   and a rearwardly inclined chute projecting forwardly from said housing and mounted on the lower portion of said retaining flange for returning granular material to the lower portion of said housing if the granular material falls through said opening in the front of said housing,
   said chute being inclined rearwardly into the lower portion of said front opening in said retaining flange.

2. In a machine for applying granular toppings to frozen dairy desserts or the like,
   the combination comprising a housing including a substantially circular generally vertical rear wall,
   said rear wall having a forwardly projecting peripheral flange,
   a generally cylindrical drum having an open rear end formed with an outwardly projecting annular flange removably received within said flange on said rear wall,
   said rear wall having a plurality of locking lugs projecting radially inwardly from said flange thereon,
   said flange on said drum having slots therein for passing said lugs,
   said drum being adapted to be locked on said rear wall by turning said drum so that said lugs are engaged with the front of said outwardly projecting flange on said drum,
   said drum having a retaining flange projecting inwardly at the front end of said drum,
   said retaining flange having a generally circular inner edge defining a front opening in said drum through which the dessert to be topped may be inserted,
   a wheel within said housing and having a generally circular disk member,
   a motor for rotating said wheel and disposed to the rear of said rear wall of said housing,
   a rotatable shaft extending forwardly from said motor and through said rear wall of said housing for rotating said wheel,
   said rear wall having a hole therein for receiving said shaft,
   said shaft having a front portion with screw threads thereon,
   said disk member of said wheel having a rearwardly projecting portion with complementary screw threads thereon removably engaged with said screw threads on said shaft,
   said wheel thereby being adapted to be unscrewed from said shaft,
   said disk member of said wheel having a plurality of scoop members projecting forwardly therefrom and spaced around the outer portion of said disk member for scooping granular material from the lower portion of said hosuing and dumping the granular material in the upper portion of said housing to provide a substantially continuous downward shower of granular material in said housing,
   and an inclined chute projecting forwardly from said housing and mounted on the lower portion of said retaining flange for returning granular material to said housing if the granular material falls through the opening in the front of said housing.

References Cited in the file of this patent

UNITED STATES PATENTS

| | | |
|---|---|---|
| 699,699 | Newberry | May 13, 1902 |
| 936,170 | Rulison | Oct. 5, 1909 |
| 1,391,604 | Baumgard | Sept. 20, 1921 |
| 1,840,289 | Hunter | Jan. 5, 1932 |
| 2,450,661 | Herrmann | Oct. 5, 1948 |
| 2,577,433 | Robb | Dec. 4, 1951 |
| 2,710,588 | Parry et al. | June 14, 1955 |
| 2,719,661 | Eisenberg | Oct. 4, 1955 |
| 3,082,737 | Mellen et al. | Mar. 26, 1963 |

FOREIGN PATENTS

| | | |
|---|---|---|
| 512,344 | Italy | Jan. 31, 1955 |